US011358736B2

(12) United States Patent
Brelati et al.

(10) Patent No.: US 11,358,736 B2
(45) Date of Patent: Jun. 14, 2022

(54) SYSTEM FOR ENHANCING THE STRUCTURAL RESILIENCE OF AN AIRCRAFT, AND AIRCRAFT COMPRISING SUCH SYSTEM

(71) Applicant: LEONARDO S.P.A., Rome (IT)

(72) Inventors: Antonio Brelati, Rome (IT); Girolamo Brelati, Rome (IT); Rosario Del Giudice, Rome (IT); Tommaso Romano, Rome (IT)

(73) Assignee: LEONARDO S.P.A., Rome (IT)

( * ) Notice: Subject to any disclaimer, the term of this patent is extended or adjusted under 35 U.S.C. 154(b) by 892 days.

(21) Appl. No.: 16/180,132

(22) Filed: Nov. 5, 2018

(65) Prior Publication Data

US 2019/0135444 A1    May 9, 2019

(30) Foreign Application Priority Data

Nov. 7, 2017   (IT) .................. 102017000126587

(51) Int. Cl.
*B64D 25/00*    (2006.01)
*B64F 5/40*     (2017.01)
*F16F 9/46*     (2006.01)

(52) U.S. Cl.
CPC .......... *B64F 5/40* (2017.01); *B32B 2307/762* (2013.01); *F16F 9/464* (2013.01)

(58) Field of Classification Search
CPC ................... B64F 5/40; B64D 25/00
USPC ........................................... 244/121
See application file for complete search history.

(56) References Cited

U.S. PATENT DOCUMENTS

| 4,726,426 | A | * | 2/1988 | Miller ................ A62C 99/0018 169/16 |
| 5,190,248 | A | * | 3/1993 | Lee ........................ B64D 25/00 137/67 |
| 6,452,510 | B1 | * | 9/2002 | Zysko ................... B64D 25/00 340/970 |
| 6,491,254 | B1 | * | 12/2002 | Walkinshaw ............ A62C 3/08 244/118.5 |
| 2004/0099195 | A1 | | 5/2004 | Searle et al. |
| 2012/0168184 | A1 | | 7/2012 | Enk, Sr. |
| 2015/0283412 | A1 | * | 10/2015 | Kono ....................... F16L 3/08 169/62 |

FOREIGN PATENT DOCUMENTS

DE      102 45 831      4/2004
WO      WO 2017/203385  11/2017

* cited by examiner

*Primary Examiner* — Christopher D Hutchens
(74) *Attorney, Agent, or Firm* — Leason Ellis LLP (57) ABSTRACT

A damage recovery system of a fuselage of an aircraft, comprising: a tank containing a polyurethane foam; a main duct fluidically coupled to the tank to receive the foam; secondary ducts fluidically coupled to the main duct; and distribution means adapted to allow an outflow of the foam from the secondary ducts. Graphene powder can be mixed and added to the polyurethane foam. In flight, a possible leak (crack or hole) in the fuselage is plugged by the polyurethane foam with graphene powder.

29 Claims, 4 Drawing Sheets

SYSTEM FOR ENHANCING THE STRUCTURAL RESILIENCE OF AN AIRCRAFT, AND AIRCRAFT COMPRISING SUCH SYSTEM

CROSS-REFERENCE TO RELATED APPLICATIONS

This application claims priority from Italian Patent Application No. 102017000126587 filed on Nov. 7, 2017, the disclosure of which is incorporated by reference.

TECHNICAL FIELD

The present invention relates to a damage recovery system for an aircraft. More specifically, the present invention relates to a system for enhancing the structural resilience of an aircraft, or rather a system for enhancing the capacity of the aircraft to recover a safe operational state after a perturbative event of this safe operational state.

BACKGROUND OF THE INVENTION

With the decreasing cost of materials for the more commonly used types of fibres and resins, composite materials (in particular, those in carbon fibre, comprising carbon fibre impregnated with epoxy resins) are applied on a wide scale for making parts of means of transport, especially in the aerospace field. In this field, their use is basically tied to the need to reduce the weight of aircraft in order to reduce fuel consumption and increase payload; without impairing, or even improving, the mechanical characteristics of the aircraft. Other advantageous characteristics regard good thermal insulation, the elimination of corrosive phenomena and the simplification (with consequent cost reduction) of maintenance plans.

Carbon-fibre structures can be laminated (overlaid layers of pre-impregnated sheets) or sandwiched (i.e. a low-weight material with a honeycomb structure interposed between two laminates in carbon fibre, Kevlar, fibreglass and/or thin sheet metal). They may have manufacturing defects, in the sense of any deviation from the design requirements. If not detected and eliminated, these defects can grow during the operational life of the structures they form, compromising performance.

Naturally, these problems do not affect only structures in carbon fibre. Aluminium alloy sheets can also be a source of numerous defects, the dimensions of which must be monitored, taking action on the structure when the dimensions exceed critical levels (which would lead to the sheet breaking).

In other words, it is opportune to take action both on defects encountered in the manufacturing stage and on defects that might be generated during the operational life of the structures.

Normally, structures and components function even if damaged, but they must be periodically checked.

Nevertheless, unforeseeable and exceptional events, such as, for example, manoeuvres that cause localized overload, an extremely aggressive environment, or unidentified chinks that develop into cracks, tears or holes, can seriously compromise the structural stability of the aircraft and, consequently, flight safety.

SUMMARY OF THE INVENTION

One objective of the present invention is to increase the resilience of an aircraft (intended as its capacity to recover its initial operational state after an alteration to this state) during flight, in the event of structural problems due to cracks or holes that could, in particular, involve the fuselage, and that could cause depressurization problems and compromise flight safety.

This objective is achieved by damage recovery system of a structural region of an aircraft, and by an aircraft that incorporates this system, as defined in the appended claims.

BRIEF DESCRIPTION OF THE DRAWINGS

For a better understanding of the present invention, some preferred embodiments will now be described, purely by way of non-limitative example and with reference to the accompanying drawings, where.

DETAILED DESCRIPTION OF THE INVENTION

Figure 1:
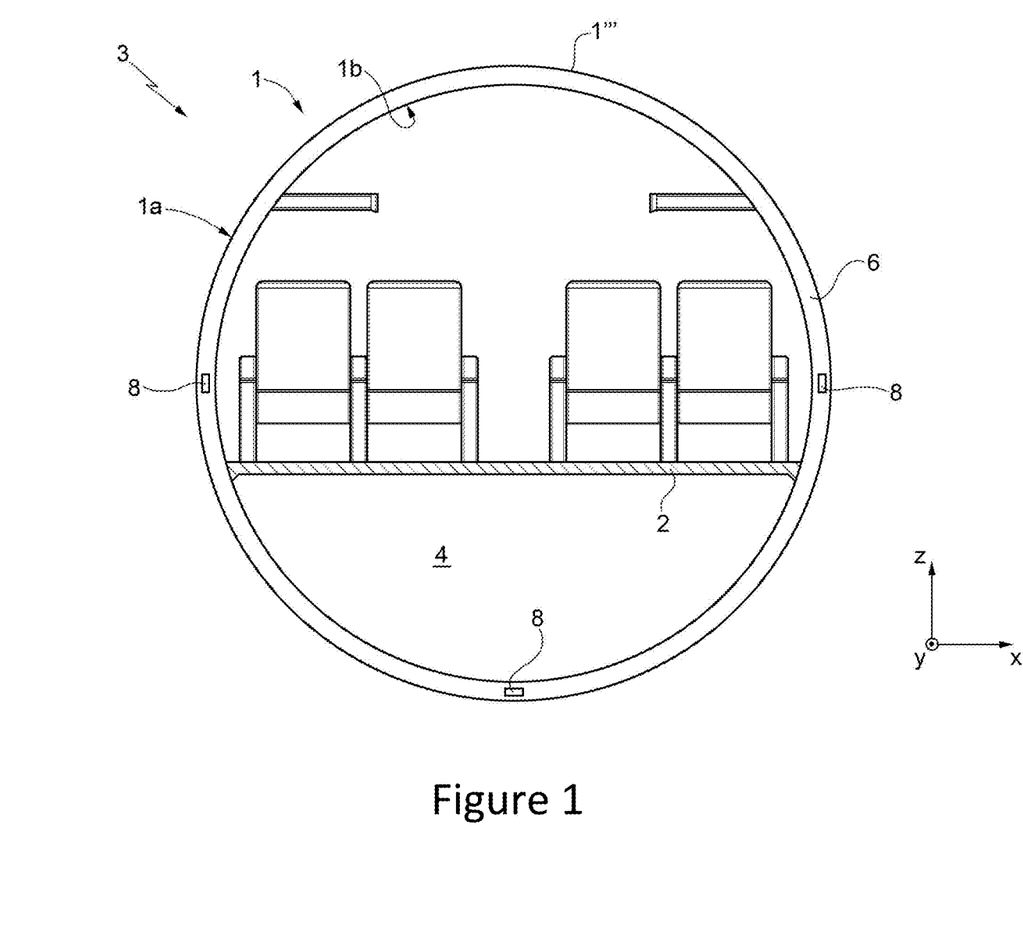
FIG. 1 shows, in a sectional view, a portion of a fuselage of an aircraft equipped with a repair fluid distribution system, according to an aspect of the present invention.

Referring to FIG. 1, a sectional view of a portion of a fuselage 1 of an aircraft 3 and a reference system of orthogonal axes X, Y and Z are shown.

Figure 2:
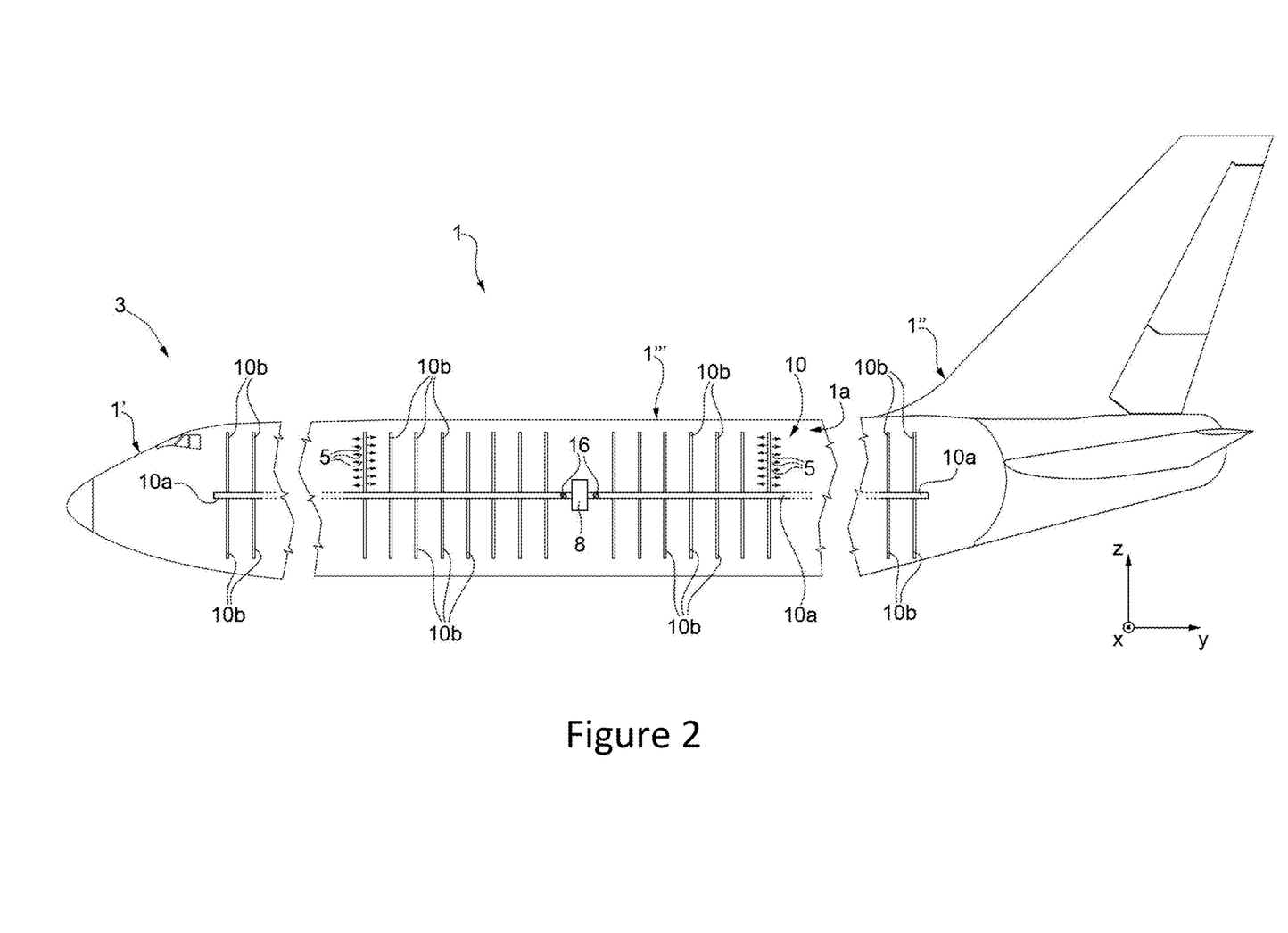
FIG. 2 shows, in a side view, an aircraft incorporating the fluid distribution system, according to an aspect of the present invention.

FIG. 2 shows a side view of the aircraft 3 in the reference system of FIG. 1.

From the aerodynamic viewpoint, the fuselage 1 serves to connect the wings to the tail unit, but, obviously, as an aircraft is usually a means of transport, the fuselage houses the payload transported by the aircraft 3, for example passengers and/or goods and/or other type of load.

For a transport aircraft with a pressurized cabin, the fuselage 1 usually has a cylindrical shape, tapering at the nose and tail, and is formed by three parts: the front part 1' which house the cockpit, the rear tapered part 1" that supports the tail unit, and the central part 1'" that hold the payload.

Typically, in civil aircraft, compartments 4 intended for baggage are found under a floor 2 in the fuselage 1, while flight controls, electrical cables, water system piping and ventilation system ducting pass through an interspace 6. Internally, the fuselage 1 is lined with a soundproof and fireproof material. In this context, the interspace 6 is the hollow region extending between the outer skin 1a of the aircraft (usually in sheet metal or composite material) and the inner lining 1b of the aircraft (usually made of a plastic material). The distance between the skin 1a and the lining 1b, measured along the direction of axis X or Z (i.e. along a direction radial to both circumferences 1a and 1b in FIG. 1) is typically between 3-5 cm for small fuselages (e.g. small aeroplanes not suitable for passenger transportation) and 10-30 cm for large fuselages e.g. aircraft for transporting hundreds of passengers).

According to one aspect of the present invention, the interspace 6 houses one or more tanks 8 (a plurality of tanks 8 is shown in FIG. 1) adapted to hold a polyurethane foam, as described in more detail hereinafter. Polyurethane foams suitable for the object of the present invention are commercially available and, by way of example, possess the following characteristics: temperature resistant between −60° C. and +100° C.; hardened foam density of approximately 0.025 g/cm³-25 kg/mc; maximum dimensional stability −3% (after 24 hours); good thermal insulation characteristics (ranging between 0.2 W/mK (watts per meter-kelvin) and 0.04 W/mK, for example equal to 0.036 W/mK).

Referring to FIG. 2, the one or more tanks 8 are fluidically coupled to a distribution network 10, comprising a main duct 10a from which a plurality of secondary ducts 10b branch off. The secondary ducts 10b are fluidically connected with the portion of main duct 10a from which they branch and, through the latter, with the one or more tanks 8. The distribution network 10 and the tanks 8 are configured such that, during use and according to needs, the polyurethane foam contained in the tanks 8 can flow through the main duct 10a and, from here, to the secondary ducts 10b.

The secondary ducts 10b also have one or more respective openings 12 (shown in FIG. 3), via which the polyurethane foam that flows through them can flow out and spread inside the interspace 6.

When the aircraft 3 is in a flight operating condition, the pressure difference between the environment outside the fuselage 1 and the inside of the fuselage 1 (including the interspace 6) is such that a possible crack or hole (in general, volumetric sealing imperfections or leaks) in the skin 1a causes depressurization of the environment inside the fuselage 1, which causes a preferential movement of the polyurethane foam from the openings 12 of the secondary ducts 10b towards the crack or hole.

The polyurethane foam is adapted to spread (as shown by arrows 5 in FIG. 2), during use, as a consequence of the pressure gradient existing between the inside and the outside of the fuselage 1, and occupy the surface around the leak.

The polyurethane foam solidifies over the leak, plugging it and fixing the cause of the depressurization.

In other words, the foam, released close to a leak, works like a repair foam, sealing the leak and so resolving the depressurization problem, and also prevents possible further expansion of the area of the leak.

According to one aspect of the present invention, a graphene powder, formed by splinters or particles of pure graphene having an area ranging between 10 μm² and 1 mm², is mixed with the polyurethane foam when the latter flows out from the openings 12 of the secondary ducts 10b, i.e. before solidification of the polyurethane foam around and over the leak to be plugged.

The applicant has observed that the use of splinters of graphene endows the polyurethane foam, when solidified, with high solidity performance. By adding graphene powder or splinters to a polyurethane foam, of a type in itself known, it is thus possible to obtain an effect of increasing the solidity of the compound, making it suitable for use in the aeronautics field and, in particular, for temporarily fixing structural damage (such as cracks or holes) in the skin 1a of an aircraft.

In general, the polyurethane foam contained in the tank 8, with graphene powder added at the moment of its dispersion inside the interspace 6, has one or more of the following characteristics: low density, such that the weight force is negligible with respect to the retaining force due to the pressure gradient, to ensure high mobility; solidifies at the leak owing to the temperature gradient between the inside of the aircraft, in the interspace, and the outside environment, so as to have a sealing action on the leak.

Figure 3:
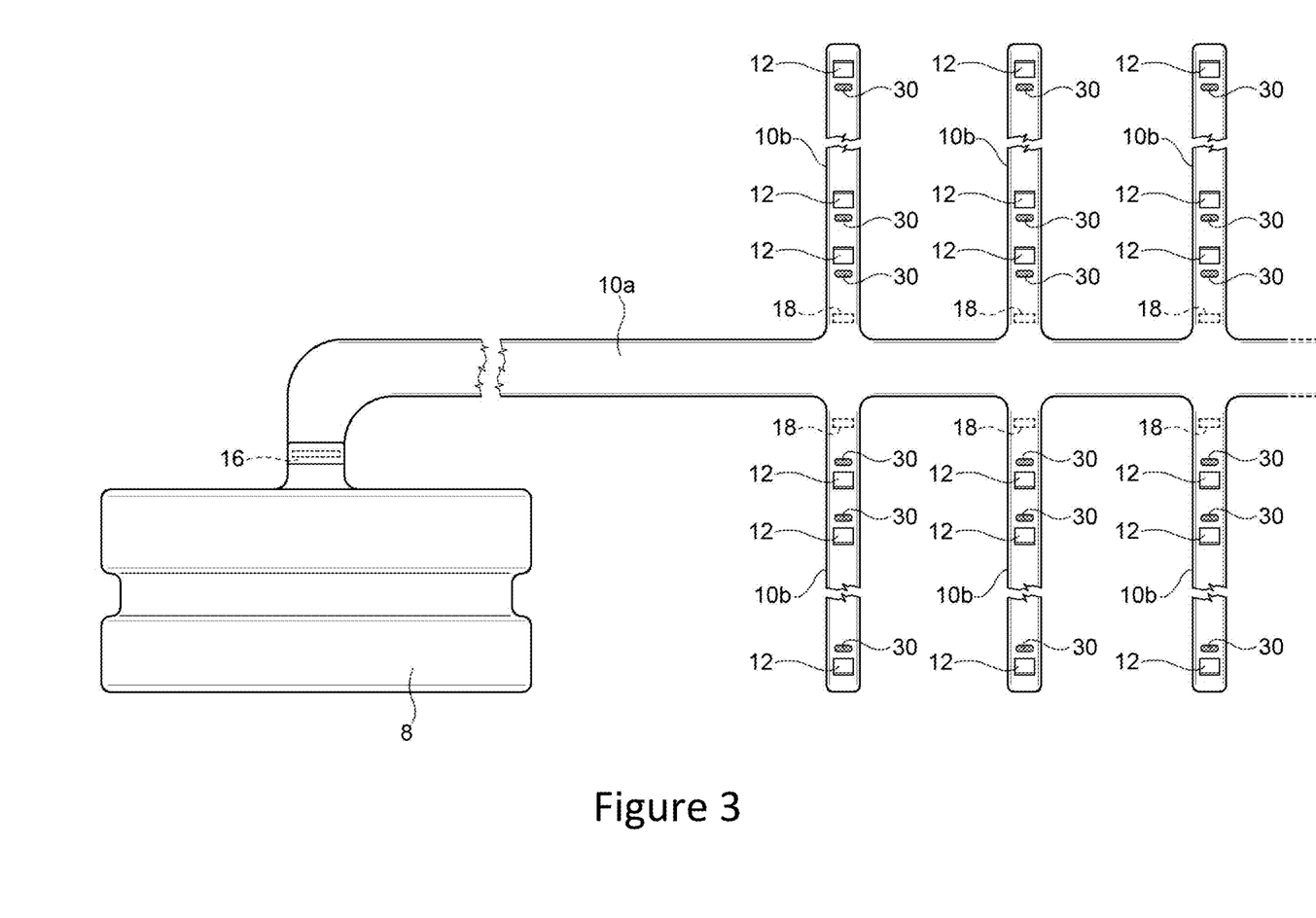
FIG. 3 shows, in greater detail, a portion of the fluid distribution system, according to an aspect of the present invention.

FIG. 3 shows a tank 8 fluidically coupled to a main duct 10a, from which secondary ducts 10b branch off. Other tanks 8, not shown, can be present and coupled to respective regions of main duct 10a. In this example, each secondary duct 10b is provided with a respective plurality of openings 12, adapted to form an outlet for the polyurethane foam contained in the tank 8. The openings 12 have, by way of example, a rectangular shape with an area ranging between 1 cm² and 10 cm². It is obvious that the openings 12 can have any shape, for example oval, trapezoidal, generically polygonal or yet other shapes, with sizes comparable to the aforementioned sizes indicated for the rectangular openings.

For small aircraft, the main duct 10a has, for example, a circular section with a diameter of 3-10 cm, while the secondary ducts 10b have a circular section with a diameter of 2-3 cm. For large aircraft, the main duct 10a has, for example, a circular section with a diameter of 10-30 cm, while the secondary ducts 10b have a circular section with a diameter of 4-6 cm.

The main duct 10a and secondary ducts 10b can be made with various types of materials, for example, aluminium or aramid synthetic fibre (Kevlar®) or a plastic material, or another material chosen according to needs (e.g. carbon fibre, fibreglass, thermoplastic material, or composite material). In one embodiment, the main duct 10a and secondary ducts 10b are in aluminium and have steel connecting sections.

The tanks 8 are made of metal or a composite material or a plastic material, have a thickness that varies between 0.5 mm and 5 mm, and are adapted to contain said foam at a working pressure of between 1.5 and 3 atm ($1.5 \cdot 10^5$-$3 \cdot 10^5$ Pa).

As schematically shown in FIG. 3, the ducts of the distribution network 10 reciprocally extend so as to create a distributed network in the interspace 6 such that each secondary duct 10b is spaced out from the closest secondary duct 10b by approximately 1 metre. The main duct 10a runs longitudinally (i.e. along the direction of axis Y) in the fuselage 1, and the secondary ducts 10b, of smaller section, engage with the main duct 10a in the vertical direction (i.e. along the direction of axis Z) in a "herringbone" configuration or "comb" configuration. The main duct 10a has the function of transporting the foam from the tank 8 along the entire extension of the fuselage 1, while the secondary ducts 10b have the function of distributing, during use, the foam on the inner wall of the interspace 6, where a leak is present.

According to one aspect of the present invention, several tanks 8 are arranged along the longitudinal extension of the main duct 10a, fluidically coupled to the main duct 10a via local connection ducts. In this case, the tanks 8 are housed in the interspace 6 and have a shape such as to respect the dimensions of the interspace 6 that houses them. In particular, in the case of substantially rectangular tanks, one dimension is limited by the thickness of the interspace 6, intended as the useful distance (empty space) between the skin 1a and the lining 1b, and is, for example, equal to the diameter envisaged for the main duct 10a (e.g. 3-10 cm). The tanks 8 also have a base surface with an area ranging between 25 cm² and 2500 cm² and a height at the most equal to the size of the interspace 6. According to different embodiments, the tanks can be shaped as needed, for example, so as to adapt them to special configurations of the interspace and can thus have a partially curved shape. In general, each tank 8 is adapted to contain a quantity of foam ranging between 10 cl (centiliter) and 50 cl for tanks housed inside the interspace.

According to a different embodiment, a sole tank is present, configured to contain an amount of foam sufficient to feed the main duct 10a and the secondary ducts 10b (e.g. a tank with a capacity equal to tens of litres, for example greater than 40 litres). In this case, the tank has dimensions such that it cannot be easily arranged in the interspace 6. Such a tank can therefore be arranged inside the fuselage 1, in addition to the interspace, for example in the luggage compartments 4, the passenger area, or in another location considered suitable.

A solution that envisages a plurality of distributed tanks 8 is advantageous with respect to a solution that envisages a single tank 8, as it allows optimal distribution of the weight and maximises the delivery speed of the foam, which only needs to travel a short distance to flow out from the openings 12.

Intermediate solutions can also be provided, including a plurality of large or medium sized tanks 8 (for example, from two to four tanks 8), housed inside the fuselage 1 in addition to the interspace 6 (for example in the luggage compartments 4, the passenger area, or in another location considered suitable). This solution is particularly suited to large aircraft and, in this case, each of the tanks 8 has a capacity ranging between 10 litres and 50 litres and each one of them is positioned so as to serve a respective macro-section of the fuselage 1, i.e. a surface with a size of several tens of square metres, for example, 25 $m^2$. In this example, considering the surface of the entire interspace 6 of the fuselage 1, each section of 25 $m^2$ is served by a tank 8.

In order to feed the foam to the distribution network 10 only when necessary (in order to avoid solidification of the foam in the ducts), one or more valves, in particular electrovalves, are provided. Referring to FIG. 3, a main electrovalve 16 is placed near or at the coupling region between the main duct 10a and each tank 8 and, optionally, further electrovalves 18 are placed at each secondary duct 10b, to enable or block the flow of foam from the main duct 10a to the respective secondary duct 10b.

Electrovalve 16, like each of electrovalves 18 when present, is, in one embodiment, an electrovalve for hydraulic applications, formed by a membrane-type of mechanical opening and closing device, which is raised or lowered to allows the outflow or retention of the foam. The membrane of each electrovalve is, for example, electrically actuated and is controlled by a solenoid that, when current passes through it, attracts a ferrous core coupled to the membrane, moving the membrane and thus enabling the opening or closing of the respective electrovalve. Electrovalves of this type are known to experts in the field and commercially available.

In one embodiment, the electrovalves 16 and 18 can be of the bistable type, i.e. equipped with two solenoids, with an independent power supply. The valve is in a position of stable equilibrium in the last state attained of valve open or closed. To make it change position, it is necessary to supply current to the solenoid that is in the other position. However, this solution entails consuming current even when it is not necessary to feed the foam to a leak.

It might therefore be preferable to use monostable electrovalves 16 and 18, i.e. electrovalves configured to be in stable equilibrium (here, in the valve closed state) when not powered, while when they receive an opportune power supply they activate (here, in the valve open state). In this way, the electrical control signal for the electrovalves 16 and 18 is only generated when necessary, i.e. when there is a leak in the fuselage.

In alternative to that previously described and illustrated in FIG. 3, a further embodiment of the present invention envisages replacing each opening 12 with a respective local electrovalve, controlled to open when needed. In this way, it is possible to activate only the electrovalves located in a specific area of interest and avoid possible dispersion of foam in regions of the interspace 6 not affected by the leak to be repaired.

Figure 4:
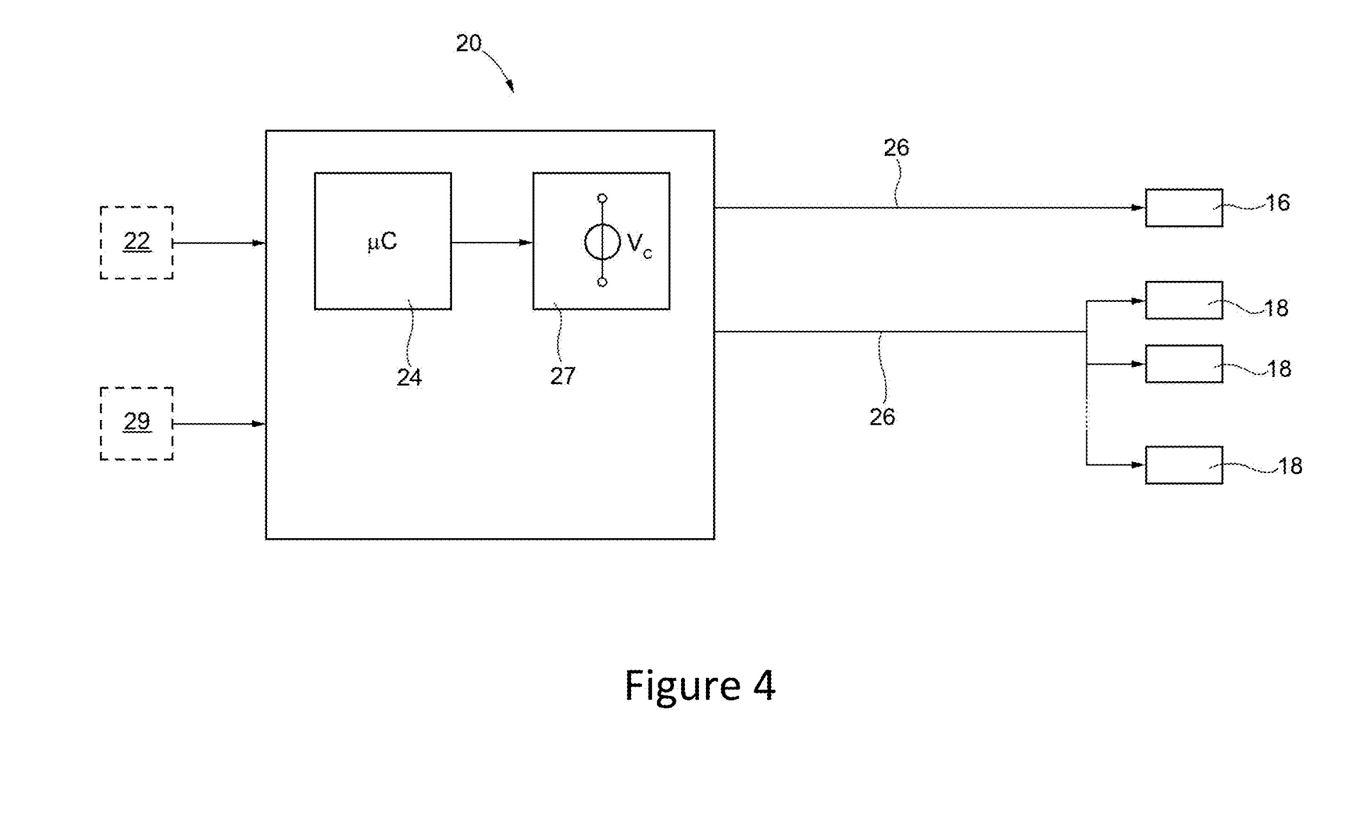
FIG. 4 schematically shows a control circuit of the fluid distribution system.

A control system 20, schematically shown in FIG. 4, includes a microcontroller 24 and electrical connection means 26 (e.g. electrical cables) to connect the control system 20 to electrovalve 16, and to electrovalves 18 when present. The control system 20 is configured to control the opening of the electrovalves 16 and 18 when necessary, i.e. when a depressurization of the inner region of the fuselage 1 is detected.

Pressure sensors 22 are already present on aircraft for the purpose of monitoring the internal pressure of the aircraft and the output signal they generate can be used in the context of the present invention. When the signal of the pressure sensors 22 identifies a depressurization of the aircraft, an electric control signal is supplied to the electrovalves 16 and 18 via the cables 26. The control signal of the electrovalves is a current signal generated by a voltage/current generator 27 controlled by the microcontroller 24, having an opportune voltage Vc (for example ranging between 12V and 48V) and such as to command the opening, in a manner which is in itself known, of the electrovalves 16 and 18, enabling the foam to flow through the main duct 10a and the secondary ducts 10b. The voltage/current values used for this purpose are compatible with the onboard power supplies of known types of aircraft.

In one possible embodiment, the control system 20 is an open-loop system, also known as a "command system", i.e. a non-automatic system that operates based on the manual commands imparted by an operator, in particular the flight crew aircraft.

Therefore, in this case, the operator performs the action of manually activating the system, namely sending the activation (open) command of the electrovalves. In one embodiment, the control system 20 opens all the valves simultaneously; in a further embodiment, the operator has more options by means of a multi-selector switch 29 so as to open or close the valves in groups, where each group corresponds to a specific section of the fuselage 1. In this context, an analogue or digital multi-selector switch is provided, of a type similar to the analogue or digital multi-selector switches already present and used for managing the onboard air ventilation and lighting systems. An analogue solution for the multi-selector switch envisages the use of a rheostat that generates different DC voltage levels, which allow powering the electrovalves 18 selectively, opening only some of the branches of the distribution network 10.

In a different embodiment, in alternative or supplementary to the previous one, the microcontroller 24 of the control system 20 is configured to receive pressure information from the pressure sensors 22 and, based on the received signal, automatically activate the opening of the electrovalves 16 and 18, even if no manual command is imparted by an operator. In this way, as soon as a depressurization of the aircraft is detected by the pressure sensors 22, the microcontroller 24 sends the open command for the valves 16 and 18 and the foam can propagate, in the presence of an effective pressure gradient, in the interspace 6. In the event of failure of the pressure sensors 22, such that they detect a non-existent depressurization, there will be no pressure gradient to activate the flow of foam, which therefore does not discharge.

In a system "off" condition, i.e. an operating condition in which the foam does not flow from the distribution network 10 (electrovalves 16 and 18 closed), the tanks 8 are fluidically connected to the ducts, but the control system 20 keeps the foam sealed in the tanks 8.

In the system "on" condition, and in the presence of an effective depressurization of the aircraft caused by a leak in the fuselage 1, the control system 20 opens electrovalve 16 (and one or more of electrovalves 18 when present) and the foam flows into the ducts 10a and 10b. The flow of foam in the ducts 10a and 10b, up to its outflow through the openings 12, is guaranteed by the pressure gradient that necessarily arises due to the leak; the foam will thus flow with a higher flow rate to the opening 12 closest to the leak and will automatically stop when the leak is plugged. It should be noted that the pressure gradient is a vector quantity, the direction of which is directed from the high pressure area to the low pressure area, and that, in the case of an aircraft in flight, the internal pressure is greater than the external pressure; due to this, in the presence of a hole/crack, the foam spreads from the inside of the aircraft to the outside, along the direction of the gradient. In the case of activation of the system forming the subject of the present invention, the openings 12 geometrically closest to the hole/crack are subjected to a larger gradient and so the foam flows from them with a higher flow rate, spreading along the direction of the gradient, i.e. along the line joining the opening 12 to the hole/crack.

The graphene powder, due to its specific weight being lower than that of the polyurethane foam, will remain on the surface of the flow of foam and will be mainly concentrated in the portion of foam that passes through the hole, contributing to its solidification and solidity. By adding splinters of pure graphene, it is possible to obtain an effect of increasing the solidity of the compound and quicker solidification, which, in principle, works like the two-component resins used in the aeronautics field for sealing.

The solidification time of polyurethane foams is in the order of several minutes, for example 15-20 minutes; regarding this, it is preferable to size the distribution network 10 so that the maximum distance between an opening 12 and any possible leak through the fuselage 1 can be covered by the foam in less than 10 minutes under the condition of a pressure gradient greater than approximately 0.3 atm ($0.3 \cdot 10^5$ Pa). To this end, each opening 12 is intended to operate on a surface of approximately 0.25-1 m$^2$, and so the openings 12 of each secondary duct 10b are positioned at regular intervals with at least one opening every 50 cm-1 m along the length of the respective secondary duct 10b. Furthermore, each opening 12 has a diameter of approximately 0.5-1 cm.

The graphene powder is contained in capsules 30, each one placed close to a respective opening 12. To avoid possible blockage of the openings 12, the mixing of the graphene powder with the polyurethane foam takes place outside the openings 12. The capsules 30 are made of a material subject to rupture under the action of the polyurethane foam when it flows out from the openings 12; for example, the capsules 30 are made of paper, with a thickness ranging between 0.5 mm and 1.5 mm, such as to rupture and release their contents under the mechanical action of the foam's expansion. Upon opening, the capsules 30 release the graphene powder, which is concentrated in the first portion of foam flowing out, because it is precisely this first portion of foam that will pass with precedence through the leak and solidify, plugging the leak. The foam that subsequently flows to the leak serves as reinforcement for the solidified surface layer rich in graphene powder.

The applicant has verified that the hole/crack that can plugged using the described method has a surface area in the order of 10-30 cm$^2$, and the amount of graphene powder in a single capsule 30 is sized considering a surface threefold the maximum surface to be handled, and so each capsule contains approximately 30-90 cm$^2$ of pure graphene.

The paper capsules 30 are coupled to the secondary duct 10b, by means of an adhesive/sealing material, at a distance of a few centimetres (1-3 cm) from the opening 12, so that when the flow of foam spreads under the effect of the pressure gradient, it causes the capsules to rupture and the graphene to escape and be added to the foam.

In alternative to what has been described, the capsules 30 could also be made of a plastic or metal material and have their opening controlled by means of respective electrovalves (not shown in the figures). In this case, the capsules 30 are positioned at the openings 12 so as to be superimposed on them, and are mechanically coupled to respective secondary ducts 10b via opportune mechanical means, for example, clips. The command for opening the capsule 30 is given at the same time as that for the electrovalves 16 and 18 (e.g. via the same electrical control signal), so that the graphene powder contained therein can escape and, falling by gravity, become added to the foam spreading out through the openings 12.

The distribution network 10, including the ducts 10a and 10b and tanks 8 can be fastened to the walls that internally delimit the interspace 6, for example, via the same fastening means used to hold the existing ductwork for air conditioning distribution inside known types of aircraft (housed in the interspace 6), or the pipework of the hydraulic system (also housed in the interspace 6) in known types of aircraft. These fastening means include, for example, clips or rivets that use the stringers (longitudinal beams of the skeleton of the fuselage) as supports.

The present invention provides a technical solution, based on the implementation of a system of tanks with foam deployed in the interspace of the fuselage, which can be used to increase the safety level of aircraft. In fact, the present invention enables increasing the structural resilience of the aircraft in flight. In the event of a depressurization due to a hole or crack or other type of leak, the foam distribution network enables spreading the repair foam that then occupies the surface with the leak and seals it through its adhesive action, so as to limit risks of depressurization and expansion of the leak, which would compromise flight safety.

From what has been described, it is evident that the innovation according to the present invention represents a significant evolution with respect to that reported in the literature and known in the state of the art.

In particular, the present invention enables improving the structural resilience capacity of the fuselage of an aircraft, as previously described.

The described technical solution is also advantageous as it envisages the use of graphene powder as an important element of the repair compound, which endows the foam with high solidity performance. By adding splinters of pure graphene, it is possible to obtain an effect of increasing the solidity of the compound.

Finally, it is clear that modifications and variants can be made to the invention described and illustrated herein, without departing from the scope of the present invention, as defined in the appended claims.

For example, the same aircraft could house a plurality of polyurethane foam distribution networks, coupled to respective one or more tanks 8, for redundancy.

Furthermore, with some modifications, the distribution network 10 according to the present invention can be used in a different application. This further application includes carrying out tests, with aircraft on the ground, for detecting volumetric sealing imperfections during final commissioning or periodic overhauls. In this case, the tanks 8 are filled with a non-adhesive foam and the capsules 30 containing graphene powder are not present. The non-adhesive foam is a foam that solidifies as inert dust so that it can be easily removed at the end of the phases of the test. This foam (usually made with oil derivatives) is, in itself, known and already used in non-destructive tests for pipes or gas leak detection systems.

During the test, the fuselage is brought to an internal pressure (e.g. approximately 2.5 atm) higher than the external pressure (atmospheric pressure), and the system is activated to release the foam. In the event of an air leak due to a defect to be detected, the foam passes through the leak and will be noticeable on the outer surface. After terminating its action, the foam will solidify as inert dust and can be removed by suction. This test technique is found to be more effective in terms of resolution, times and costs with respect to currently used techniques.

Furthermore, a colouring agent can be added to the foam, so that it works like a detector foam with the effect of visually highlighting the position on the outer surface of the fuselage of any crack or hole causing an air leak.

The invention claimed is:

1. A damage recovery system of a structural region (1) of an aircraft (3), comprising:
    a first tank (8) containing a polyurethane foam;
    a main duct (10*a*) fluidically coupled to the tank (8) to receive said polyurethane foam during a first operating condition;
    a plurality of secondary ducts (10*b*), fluidically coupled to the main duct (10*a*) to receive said polyurethane foam during the first operating condition;
    release means (12) for releasing said polyurethane foam, operatively coupled to said secondary ducts (10*b*), and adapted to allow an outflow of the polyurethane foam from the secondary ducts (10*b*) during the first operating condition; and
    capsules (30), arranged in the proximity of said release means (12) and containing graphene powders, configured to release said graphene powder during the outflow of the polyurethane foam from the release means (12) so that said graphene powder can mix with said polyurethane foam.

2. The system according to claim 1, wherein the main duct (10*a*) and the secondary ducts (10*b*) are arranged with respect to one another so as to form a distribution network (10) of said polyurethane foam having a "herringbone" or "comb" shape.

3. The system according to claim 1, wherein the first operating condition is a condition of depressurization of the fuselage (1), said system further comprising a main electrovalve (16) operatively arranged at an interface section between the first tank (8) and the main duct (10*a*), configured to be controlled in a closed state in a second operating condition in which the polyurethane foam is confined in the first tank (8) and in an open state during the first operating condition.

4. The system according to claim 3, further comprising a plurality of secondary electrovalves (18) operatively coupled to respective secondary ducts (10*b*), configured to be selectively controlled in an open state or closed state during the first operating condition, so that the polyurethane foam can flow out of the main duct (10*a*) exclusively towards some of the secondary ducts (10*b*).

5. The system according to claim 3, further comprising a control circuit (20) electrically coupled to said main electrovalve (16) by means of electrical connection wires (26) and configured to control said main electrovalve (16) in an open state during the first operating condition.

6. The system according to claim 5, wherein the control circuit (20) comprises a microcontroller (24), a voltage generator (27) and activation means (22), wherein, in correspondence of a transition between the second and the first operating condition, the microcontroller (24) receives from said activation means (22) an activation signal and controls the voltage generator (27) to supply an opening signal of the main electrovalve (16).

7. The system according to claim 6, wherein said activation means (22) include at least one of the following: a manually operated switch, one or more pressure sensors.

8. The system according to claim 7, wherein, when the activation means (22) include one or more pressure sensors, the microcontroller (24) is configured to activate the voltage generator (27) when the activation signal identifies that the pressure sensors (22) have detected a depressurization of said structural region (1) of the aircraft (3).

9. The system according to claim 1, wherein said release means (12) are openings through said secondary ducts (10*b*).

10. The system according to claim 1, wherein said release means (12) are electrovalves.

11. The system according to claim 1, wherein the main duct (10*a*) has a circular section with a diameter ranging between 2 and 30 cm, and each of the secondary ducts (10*b*) has a circular section with a diameter ranging between 2 and 6 cm.

12. The system according to claim 1, wherein the main duct (10*a*) and the secondary ducts (10*b*) are made of one or more materials chosen from: aluminium, aramid synthetic fibre, plastic material, carbon fibre, fibreglass-reinforced, thermoplastic material, composite material.

13. The system according to claim 1, wherein the first tank (8) is made of one or more materials chosen from: metal, composite, plastic.

14. The system according to claim 13, wherein the first tank (8) is configured to contain said polyurethane foam at an operating pressure of $1.5 \cdot 10^5 - 3 \cdot 10^5$ Pa.

15. The system according to claim 1, wherein the first tank (8) has a capacity ranging between 1 and 50 litres.

16. The system according to claim 1, wherein the polyurethane foam has the following characteristics: resistance to temperatures ranging between $-60°$ C. and $+100°$ C.; density of the polyurethane foam in a hardened state equal to approximately $0.025$ g/cm$^3$-25 kg/m$^3$; maximum dimensional stability -3% after 24 hours; and thermal insulation ranging between 0.02 W/mK and 0.04 W/mK.

17. The system according to claim 1, wherein the graphene powder comprises splinters of pure graphene having an area ranging between 10 μm$^2$ and 1 mm$^2$.

18. The system according to claim 1, wherein said capsules (30) are configured to be subject to breakage under the action of the polyurethane foam when the polyurethane foam flows out through the release means (12).

19. The system according to claim 1, wherein said capsules (30) are made of a paper material with a thickness ranging between 0.5 mm and 1.5 mm.

20. The system according to claim 1, wherein said capsules (30) contain a quantity of graphene ranging between 30 cm$^2$ and 90 cm$^2$.

21. The system according to claim 1, wherein each capsule (30) is arranged on one secondary duct (10*b*) at a distance of 1-3 cm from a respective release means (12).

22. The system according to claim 1, wherein the capsules (30) are coupled to the secondary ducts (10b) by means of a coupling region of adhesive and sealing material.

23. The system according to claim 1, wherein each of the capsules (30) comprises a respective release electrovalve which can be controlled in opening during the first operating condition.

24. The system according to claim 23, wherein each capsule (30) is mechanically coupled to a secondary duct (10b) so as to be overlapped to a respective release means (12) so that, during the outflow of the polyurethane foam from the release means (12), the graphene powder can flow out and, falling by gravity, mix with the polyurethane foam.

25. The system according to claim 1, further comprising at least one second tank (8), containing polyurethane foam, fluidically coupled to a respective portion of the main duct (10a) to feed said polyurethane foam contained therein into the main duct (10a).

26. An aircraft (3) comprising:
a fuselage (1);
an interspace (6) of said fuselage (1);
a damage recovery or detection system according to claim 1 extending, at least partly, into said interspace (6).

27. The aircraft according to claim 26, wherein said first tank (8) is arranged inside the interspace (6), said damage recovery or detection system further comprising a plurality of tanks (8), fluidically coupled to the main duct (10a), arranged inside the interspace (6).

28. The aircraft according to claim 26, wherein said first tank (8) is arranged in said aircraft (3) outside the interspace (6).

29. The aircraft according to claim 26, wherein the damage recovery or detection system comprises a plurality of damage recovery or detection systems according to claim 1 extending, at least partly, into said interspace (6).

* * * * *